(No Model.)

T. P. RANDALL.
ANTI-RATTLER FOR THILL COUPLINGS.

No. 332,943. Patented Dec. 22, 1885.

Witnesses.
Chas. R. Burr
Thomas Durant.

Inventor
Timothy P. Randall
by Frank D. Johns
His Attorney.

UNITED STATES PATENT OFFICE.

TIMOTHY P. RANDALL, OF ADRIAN, MICHIGAN.

ANTI-RATTLER FOR THILL-COUPLINGS.

SPECIFICATION forming part of Letters Patent No. 332,943, dated December 22, 1885.

Application filed September 16, 1885. Serial No. 177,223. (No model.)

*To all whom it may concern:*

Be it known that I, TIMOTHY P. RANDALL, a citizen of the United States, residing at Adrian, in the county of Lenawee and State of Michigan, have invented certain new and useful Improvements in Anti-Rattlers for Thill-Couplings; and I do hereby declare the following to be a full, clear, and exact description of the invention, such as will enable others skilled in the art to which it appertains to make and use the same.

My invention relates to certain improvements in devices for preventing rattling of thill-couplings.

It consists in certain novelty of construction and arrangement of the various parts, all of which I will now proceed to point out and describe, reference being had to the accompanying drawings, in which—

Figure 1:
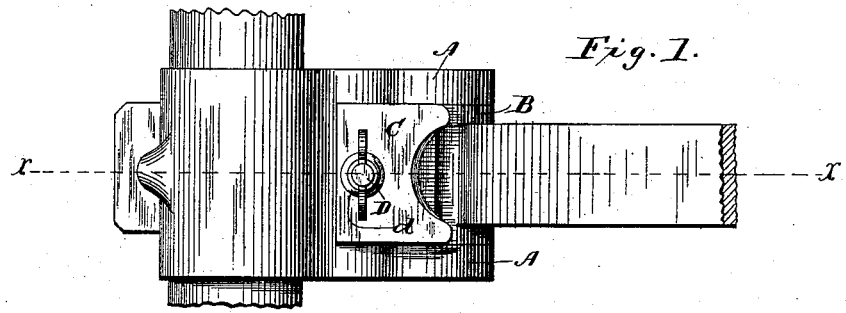
Figure 2:
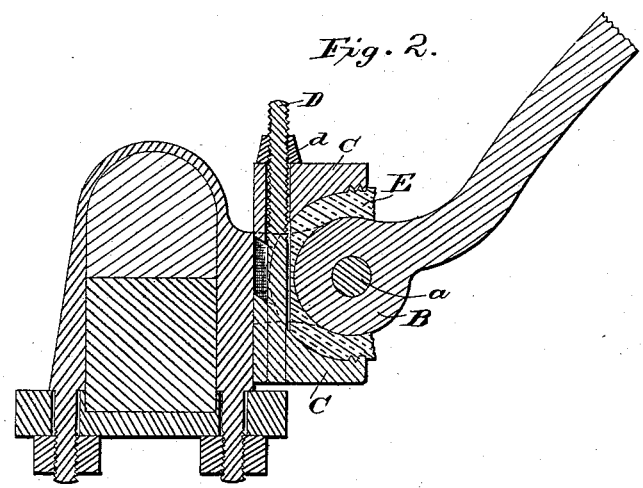
Figure 3:
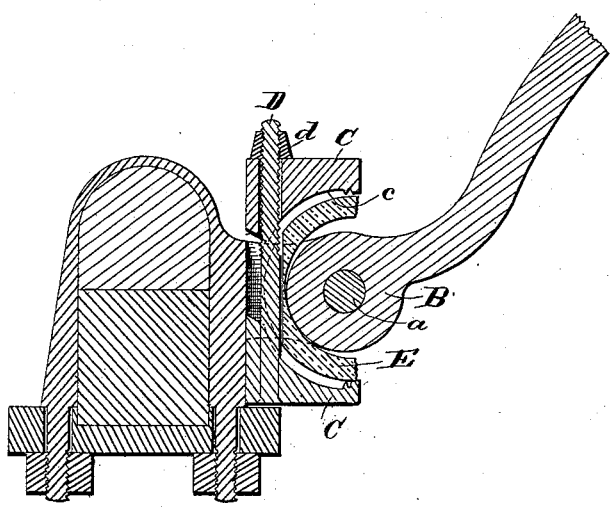
Figure 4:
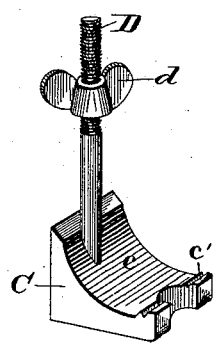

Figure 1 is a top plan of a thill-coupling provided with my invention. Fig. 2 is a vertical section taken on line $x\,x$, Fig. 1. Fig. 3 is a vertical section showing the compression-blocks loosened, and Fig. 4 is a detail.

Referring to said drawings, A A are the lugs of an ordinary thill-coupling; B, the head of the thill-iron, secured to the lug by suitable bolt, $a$. C C are two solid wedge-shaped compression-blocks placed between the lugs of the coupling and behind the head of the thill-iron. Said blocks are connected with each other by a bolt, D, which is provided with a thumb-nut, $d$. The faces $c$ of the blocks C C proximate to the thill-iron head are concave and partially surround said thill-iron head. The outer portions of the concave faces are provided with lateral corrugations or teeth $c'$. Between the wedge-shaped blocks and the thill-iron head I place an elastic packing, E, of any suitable material. When the packing is in place, it rests against the head of the thill-iron. The thumb-nut $d$ is then screwed up, bringing the wedge-shaped compression-blocks together, their concave faces compressing the packing partially around the head of the thill-iron, thus forming a perfect anti-rattling packing.

The packing may be made in any desired form. I find in practice that a straight slip of elastic material is very effective, as the concave faces of the blocks compress it around the thill-iron head and give it the proper shape. This is also the cheapest and simplest form of packing.

The great advantages of my invention are that it is simple, can be manufactured cheaply, is very effective, and forms a perfect anti-rattler, as by tightening the thumb-nut the concave faces of the blocks force the elastic packing firmly against the thill-iron. As said packing wears or becomes loose it is merely necessary to screw up the nut to make it tight again. The corrugations or teeth on the concave faces of the blocks hold the packing securely in place and prevent it from slipping.

A further advantage of my invention is that it can be put in place or removed from a thill-coupling without removing the thills.

Having thus fully described my invention, I claim as new and desire to secure by Letters Patent—

In combination with a thill-coupling, the flexible elastic packing E, the wedge-shaped compression-blocks C C, provided with concave faces $c\,c$, having corrugations $c'\,c'$, and the connecting-bolt D and nut $d$, all constructed and arranged substantially as shown and described.

In testimony whereof I affix my signature in presence of two witnesses.

TIMOTHY P. RANDALL.

Witnesses:
 CHARLES HUBBARD,
 CARRIE PAYNE.